United States Patent [19]

Corby, Jr.

[11] 4,450,339
[45] May 22, 1984

[54] WELDING TORCH WITH VISION ATTACHMENT

[75] Inventor: Nelson R. Corby, Jr., Scotia, N.Y.

[73] Assignee: General Electric Company, Schenectady, N.Y.

[21] Appl. No.: 401,473

[22] Filed: Jul. 26, 1982

[51] Int. Cl.³ .............................................. B23K 9/10
[52] U.S. Cl. ........................... 219/124.34; 219/130.01; 219/130.21
[58] Field of Search ...................... 219/130.01, 124.34, 219/130.21, 136; 358/901, 101; 250/237 R; 356/225, 234, 235; 350/266

[56] References Cited

U.S. PATENT DOCUMENTS

| | | | |
|---|---|---|---|
| 3,020,806 | 2/1962 | Castrucci | 358/90 |
| 3,128,419 | 4/1964 | Waldkötter et al. | 317/234 |
| 4,306,148 | 12/1981 | Ringwall et al. | 250/229 |

OTHER PUBLICATIONS

G. R. Miczaika et al., *Tools of the Astronomer*, 1961, pp. 248-249.
"Fiber-Optics Couple Arthroscope to TV", *NASA Tech. Briefs*, vol. 5, No. 4, Fall-1980, pp. 462-463.
S. H. Rao, CWR Technical Report 529613-81-3, Ohio State University, Sep. 1981, pp. xi, xii, 1-5, 24-41.

*Primary Examiner*—C. C. Shaw
*Attorney, Agent, or Firm*—Donald R. Campbell; James C. Davis, Jr.; Paul R. Webb, II

[57] ABSTRACT

A gas tungsten arc welding torch suitable for robotic welding has an improved built-in optical vision sensor which images the weld puddle and weld region on the face of a fiber optic cable; the image is relayed to a video camera and computer to control the torch motion and weld process. The electric arc is much brighter than the area around the arc it is desired to image. A shaped blocking device on the tungsten electrode, such as a molybdenum sleeve or collet set back so that the arc is undisturbed, prevents the arc from being imaged and eliminates image distortions caused by the presence of the bright arc.

8 Claims, 7 Drawing Figures

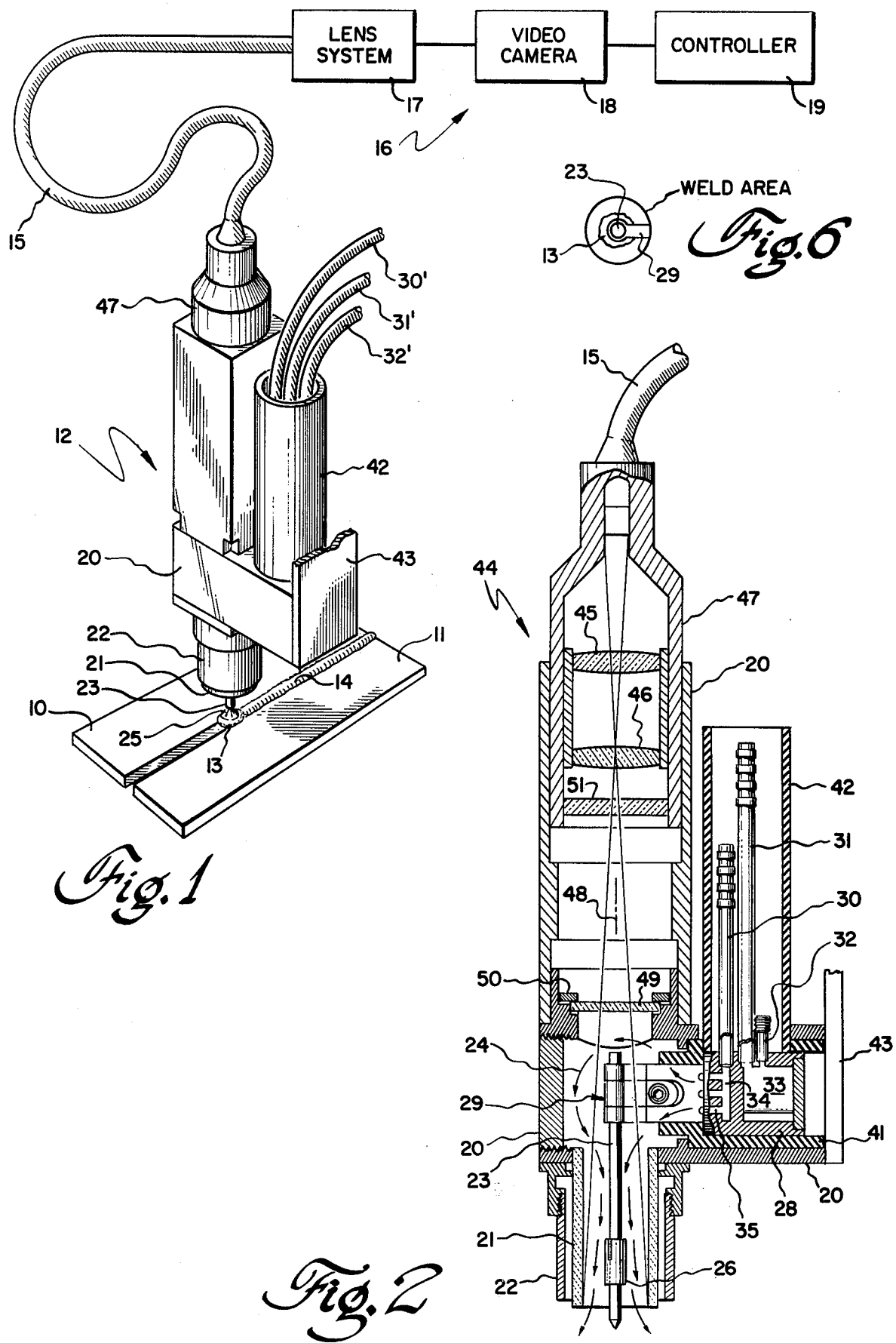

WELDING TORCH WITH VISION ATTACHMENT

BACKGROUND OF THE INVENTION

This invention relates to electric arc welding and more particularly to an arc welding torch having an improved integral optical system which provides real time images of the weld region.

Good arc welds are achieved by controlling weld current, weld penetration, centering of weld puddle over part seam, seam bead lay rates, etc. Open loop machine welding, in which weld parameters are selected on the basis of past experience, does not produce good welds. For consistently good machine welding, sensing of the weld area and weld puddle characteristics and using this information as feedback to control the welding process is needed. Some experiments have been conducted at the Ohio State University Center for Welding Research in which the weld puddle has been viewed by an overhead optical system looking down over the welding electrode. In these experiments, the conventional welding torch, open optical system, and video camera were carried on a large platform unsuitable for any practical welding application. Refer to CWR Technical Report 529613-81-3, S. H. Rao, September 1981, especially pages 27–33.

In concurrently filed application Ser. No. 401,471, A. W. Case, Jr., N. R. Kuchar, and D. C. Peroutky, "Arc Welding Torch with Integral Vision Sensor", assigned to the same assignee, the optical torch has a configuration that makes it suitable for industrial welding. The center of the torch is cleared and presents minimum obstruction to passage of light to the optical lens; the slim profile electrode holder is out of focus and not evident in the image of the weld puddle and weld area. When coupled to a remote video-like camera and controller, the torch-vision system permits control of torch manipulation and of the weld process. One embodiment of this torch is shown in FIGS. 1, 2, and 5 and is described in detail.

Due to the incomplete blocking of light from the arc by the tungsten electrode, an over-saturated image occurs near the electrode. This is because the brightness of the electric arc is many times the brightness of the surrounding area illuminated by the arc. Since it is desired to image the area surrounding the arc, the presence of the arc overloads the sensor locally.

SUMMARY OF THE INVENTION

The use of a shaped light blocking device in the vicinity of the electric arc eliminates image distortions caused by the presence of portions of the intensely bright arc. The blocking device shields the arc from being imaged and improves the image generated by the gas tungsten arc welding torch having the integral vision system just described. The image block is typically a molybdenum sleeve mounted on the electrode, set back from its tip sufficiently, four to six times the electrode diameter, to allow the arc to be undisturbed by its presence. The molybdenum sleeve has a circular or elliptical cross section, the latter preferred because as the torch travels along the joint in the workpiece, the molten puddle of metal has an oval shape downstream of the electrode and the arc energy spreads over a noncircular area.

Alternatively, the image block is a molybdenum collet for holding the electrode and it is mechanically secured to the slim profile, projecting arm, copper electrode holder. This has advantages beside improving the image of the weld puddle and weld area and eliminating extraneous light in the optical system. There may be other sources of stray or reflected light in the scene that is imaged; the cross section of the stop is tailored to block any particular appearance of the arc and artifact.

BRIEF DESCRIPTION OF THE DRAWINGS

FIG. 1 shows seam welding with a gas tungsten arc welding torch which has a vision attachment and remote video camera and controller;

FIG. 2 is a vertical cross section through the torch and integral optical system;

FIG. 6 is a view of the weld area through a window in the torch; and

DETAILED DESCRIPTION OF THE INVENTION

Figure 3:
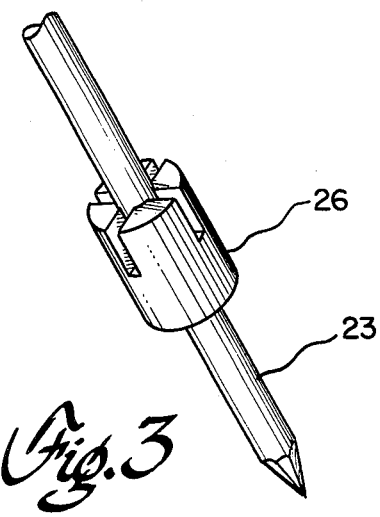
FIG. 3 is an enlarged partial perspective of the tungsten electrode and molybdenum sleeve blocking device.

In FIG. 1, seam welding of workpieces 10 and 11 is illustrated using an electric arc welding torch 12 that has a built-in optical system. The weld puddle 13, part of the remelt zone 14, and adjacent weld region are imaged on the face of a fiber optic cable 15 and the image is transferred to a remotely located system 16. The image is magnified by a lens system 17 and relayed to a video camera 18 such as General Electric's TN 2500 Charge Injection Device Camera, and hence to a television monitor where the image may be viewed. The video output is fed to a computerized controller 19 and used in a feedback arrangement to control movement of the torch and the welding process to achieve consistently good quality welds.

One embodiment of the gas tungsten arc welding (GTAW) torch with an improved integral optical system is shown in FIGS. 2–6. This torch can be employed for welding in almost all applications in which a conventional gas tungsten welding torch is used. The torch has a water cooled copper torch body with an integral slim profile electrode holder and with means for providing cover gas flow to the weld region. An optical lens is located directly above the electrode to image the weld region on the face of the fiber optic bundle. The torch and optical components are supported in a compact enclosure.

At the lower end of metal housing 20, FIG. 2, is a cylindrical ceramic gas cup or nozzle 21 which is surrounded by an annular metal gas cup 22. The replaceable tungsten electrode 23 is at the center of gas cup 21, approximately on the optical centerline. Cover gas flow is indicated by arrows 24; the electrode, the weld puddle, the electric arc 25 (FIG. 1), and adjacent heated areas of the workpieces are protected from atmospheric contamination by the gaseous shield. The cover gas is usually an inert gas such as argon or a mixture of inert gases.

Figure 4:
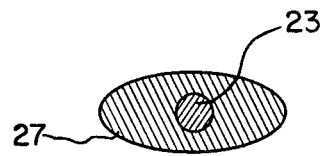
FIG. 4 is a cross section of the preferred elliptical blocking device.

An image block or stop is fitted near the electrode in the vicinity of the arc. This device acts to eliminate the image distortions caused by the presence of portions of the intensely bright arc, the brightness of which is many times the brightness of the surrounding area illuminated by the arc. The blocking device 26, FIG. 2, is made of molybdenum and resembles a sleeve; it is slid back over tungsten electrode 23 to the required setback, between four to six electrode diameters, to allow the electric arc to be undisturbed by its presence. Referring to FIG. 3, the diameter of split sleeve 26 is three-sixteenths of an inch, about twice the diameter of a standard three-thirtyseconds of an inch tungsten electrode. The length is one-half inch, but it may be shorter providing it stays on the electrode. Molybdenum is readily machineable and is an optimum match to most of the physical properties of tungsten. The melting temperature is as high, and the coefficient of thermal expansion of molybdenum is slightly higher that that of tungsten. Thus, the hot electrode will not split the molybdenum sleeve. A blocking device with an elliptical cross section such as is shown in FIG. 4 is preferred. As the torch 12 travels and follows the seam, the molten puddle of metal 13 at the electrode tip assumes an oval or elliptical shape downstream of the electrode tip. This causes the arc energy to be spread over a noncircular area displayed behind the electrode. Typically, the major axis of elliptical blocking device 27 is one and one-half to two and one-half times the minor axis.

Figure 5:
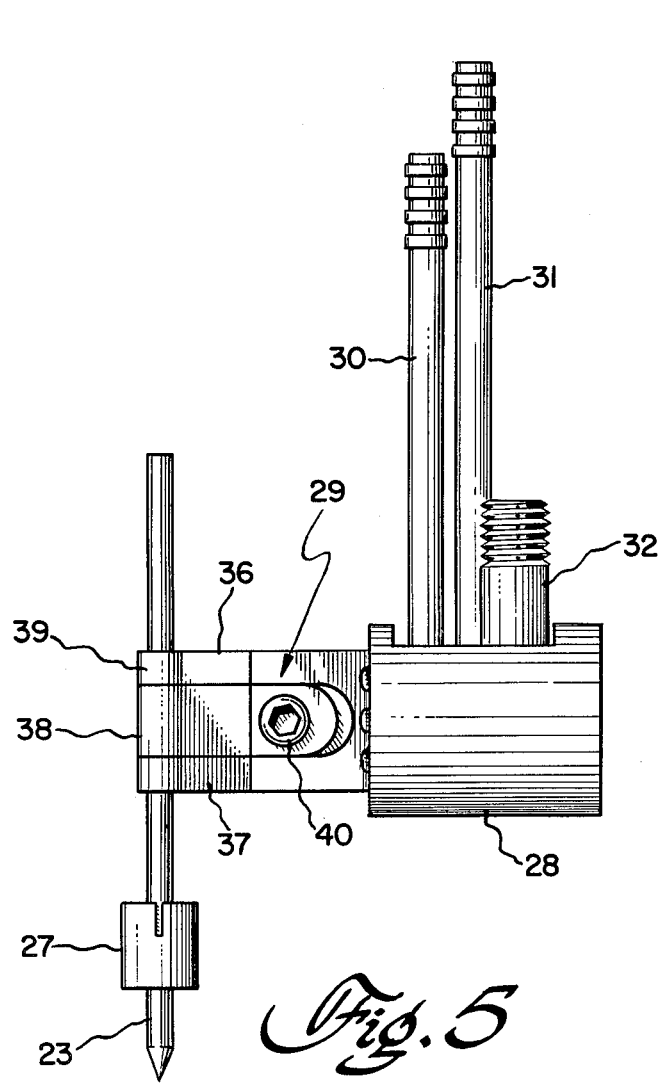
FIG. 5 is a side view of the copper torch body and integral electrode holder and of the electrode and elliptical sleeve.

The copper torch body 28, FIGS. 2 and 5, has an integral electrode holder 29 and gas, water, and electrical power connections 30-32. For a compact configuration, the torch body and slim profile holder position the electrode 23 on the optical centerline, and the gas, water, and electrical connections 30-32 emerge close to and parallel with the optical system. Unlike conventional electrode collets which occupy a large region around the electrode, the electrode holder 29 of this torch provides for a minimum cross section perpendicular to the optical axis consistent with holding the electrode securely and providing adequate conduction area for, say, a 200 ampere electrode current flow. The cylindrical torch body 28 has an interior water chamber 33 with a central baffle to provide maximum contact of water with the torch body and optimum cooling of the assembly. Incoming water or other coolant passing through the threaded tube 31 into chamber 33 must pass under the baffle in order to exit through the tube 32. The latter has a dual function as the electrical power connection, and the hose coupled to the fitting, through which water flows, has a metal braid jacket which conducts the power. Cover gas flows from the threaded copper tube 30 into a separate passage 34 and out through orifices 35 to the interior of the welding torch. Cover gas flow emerges from the torch body 28 on both sides of the electrode holder 29 to impart minimum turbulence to gas flow down through the gas cup 21. Laminar flow is preferred to achieve good shielding.

The slim profile copper electrode holder 29, which is a projecting arm or chuck, has three parts. Stationary arms 36 and 37 of the holder are integral with torch body 28, and the center arm 38 is movable. All three parts have a ring 39 at the end of the arm into which the tungsten rod electrode 23 is inserted. Movable part 38 is used to force the electrode tightly against stationary arms 36 and 37 by the action of a clamp screw 40 when it is tightened. This clamp screw is accessible through a hole in the side of the torch support framework and housing 20, to permit easy changing of electrodes. An insulating sleeve 41 electrically insulates the torch body 28 from the metal housing 20, and provides sufficient flashover distance to prevent arcing from the copper torch body to the metallic framework during high voltage weld arc starting. An insulating tube 42 encloses the gas, water, and power connections. The gas supply line 30' (FIG. 1), water line 31', and water/power cable 32', plus the fiber optic cable 15, are made to exit away from the weld area. A mounting bracket 43 attached to housing 20 permits mounting the optical welding torch 12 to any available mounting configuration, such as the wrist or arm of a robotic machine.

The torch's integral optical system is indicated at 44. The multielement lens system 45, 46 that is shown (25 mm focal length, f 1:1.4) is a good compromise between physical size, aperture opening, and depth of field for weld puddle viewing. It is inside a lens housing 47 which can be moved axially to focus on the weld spot for a reasonable (one-half inch) range of electrode extension beyond the gas cup 21. The optical axis 48 is approximately aligned with the center of gas cup 21 and with tungsten electrode 23. The optical path penetrates a quartz window 49 which seals the optics from the cover gas; this transparent, heat reflecting window is retained in the housing by a ring 50. A filter region accommodates one or more optical filters 51 which are either selective transmission filters or neutral density filters. The energy which passes through the filter is appropriate to the sensor characteristics and the task. The lens housing 47 contains a cylindrical cavity which holds the end face of fiber optic cable 15 on the optical axis and at a spacing to give the desired image demagnification. A commercially available coherent fiber optic cable 15 is used; the image picked up at one end of the bundle is transmitted faithfully to the other end.

FIG. 6 is a view of the weld area through quartz window 49. The weld puddle 13, tungsten electrode 23, and slim profile electrode holder 29, and perhaps part of the blocking device 26 or 27 depending on its cross section, would be seen if one looked down through this window. Part of the weld remelt zone and joint between the workpieces may be visible but is not illustrated. Electrode holder 29 is located sufficiently far from the optical focus region at the weld puddle to provide minimum optical distortion of the puddle image on the face of the fiber optic bundle 15. That is, the electrode holder is out of focus and not evident in the image or is barely visible. Blocking device 26 shields the electric arc from being imaged and improves the image generated by the torch-vision system. Without the light blocking device 26, there would be an oversaturated image near the electrode. Since it is desired to image the area surrounding the arc, the presence of the arc would overload the sensor locally. This extra light would be reflected around inside the fiber optic cable 15 lowering the degree of contrast in the image relayed to the solid state video camera. The use of image stop 26 blocks this extra light at the transmitting end and improves the contrast in the image.

Figure 7:
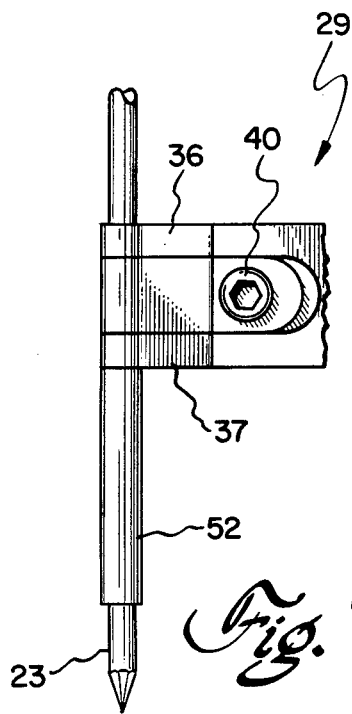
FIG. 7 is a side view of the electrode and holder and attached molybdenum collet for shielding the arc.

A second embodiment of the light blocking device shown in FIG. 7 is a molybdenum collet 52 for holding the tungsten electrode 23. There is a suitable mechanical connection between the molybdenum collet blocking device and the slim profile copper electrode holder 29. This arrangement will have the additional advantages of easier loading of the electrode after removal, better heat removal from the electrode because copper torch body 28 and electrode holder 29 are water cooled, and lower voltage drop across the length of the electrode. The bottom of collet 52 is four to six times the electrode diameter from its tip to allow the arc to be undisturbed. Molybdenum collet 52 has a circular or elliptical cross section.

There may be other sources of stray or reflective light in the scene at the weld area which is imaged. For any particular appearance of the electric arc and artifact such as a reflection, the cross section of the blocking device could be tailored to improve the image and block any such arc or artifact. Furthermore, other embodiments of the welding torch with an integral vision sensor are described and claimed in copending application Ser. No. 401,471. One is a concentric configuration which has a ring-shaped torch body and integral, radial arm electrode holder, and gas, water, and electrical power connections outside of and concentric with the optical system. The optical lens is located directly above the electrode and views the weld area through the center of the torch body. This optical welding torch has an overall length of about seven inches and a one inch field of view. Another embodiment is similar to FIG. 2 but has a folded vision attachment, and can be used for welding applications with restricted access such as is frequently encountered in orbital arc welding of pipes in the nuclear power industry. The folded optical system minimizes system height over the weld region, say to four inches. The image blocking device of the invention is used with any of these torch configurations and improves the image generated by the torch-vision system.

While the invention has been particularly shown and described with reference to preferred embodiments thereof, it will be understood by those skilled in the art that the foregoing and other changes in form and details may be made therein without departing from the spirit and scope of the invention.

The invention claimed is:

1. An improved gas tungsten arc welding torch with an integral vision sensor comprising:

a housing which supports a gas cup and an integral optical vision system having an optical axis that passes through said gas cup;

a metal torch body in said housing which has cover gas, electrical power, and coolant connections and an integral slim profile electrode holder in the form of a projecting arm for securing a tungsten electrode approximately on the optical axis and in said gas cup, said torch in operation establishing an electric arc between said electrode and the workpiece;

said optical vision system being directly above said electrode and holder and providing on the face of a fiber optic bundle an image of the workpiece weld puddle and weld area with said holder out of focus and not evident; and a blocking device on said electrode having a cross section tailored to shield the arc from being imaged and eliminate image distortions caused by the presence of the bright arc and any artifacts.

2. The welding torch of claim 1 wherein said blocking device has an elliptical cross section.

3. The welding torch of claim 1 wherein said blocking device is a split molybdenum sleeve set back four to six times the electrode diameter from its tip.

4. The welding torch of claim 1 wherein said blocking device is a molybdenum collet secured to said electrode holder whose end is set back four to six times the electrode diameter from its tip.

5. An improved arc welding torch with an integral vision sensor comprising:

a housing which supports a gas nozzle;

a torch body in said housing having cover gas, electrical power, and coolant connections and an integral electrode holder for securing a replaceable electrode, between which and a workpiece an electric arc is established, in said gas nozzle;

said torch having an integral optical vision system whose axis is approximately aligned with said electrode and that provides an image of the workpiece weld puddle and weld area, said electrode holder having a relatively small cross section perpendicular to the optical axis and being out of focus;

shaped light blocking means on said electrode for shielding the arc from being imaged and eliminating image distortions caused by the presence of the bright arc; and means for transferring said image to a remote system.

6. The welding torch of claim 5 wherein said light blocking means is a cylindrical sleeve set back from the electrode tip so the arc is undisturbed.

7. The welding torch of claim 5 wherein said light blocking means is a sleeve with an elliptical cross section set back from the electrode tip so the arc is undisturbed.

8. The welding torch of claim 5 wherein said light blocking means is a collet secured to said electrode holder whose end is set back from the electrode tip so the arc is undisturbed.

* * * * *